Dec. 23, 1958  L. A. MAJNERI  2,865,399
SHUT-OFF VALVE ASSEMBLY FOR FLUID PRESSURE SYSTEMS
Filed March 21, 1955  3 Sheets-Sheet 1

INVENTOR.
LUDWIG A. MAJNERI
BY Whittemore, Hulbert
Belknap
ATTORNEYS

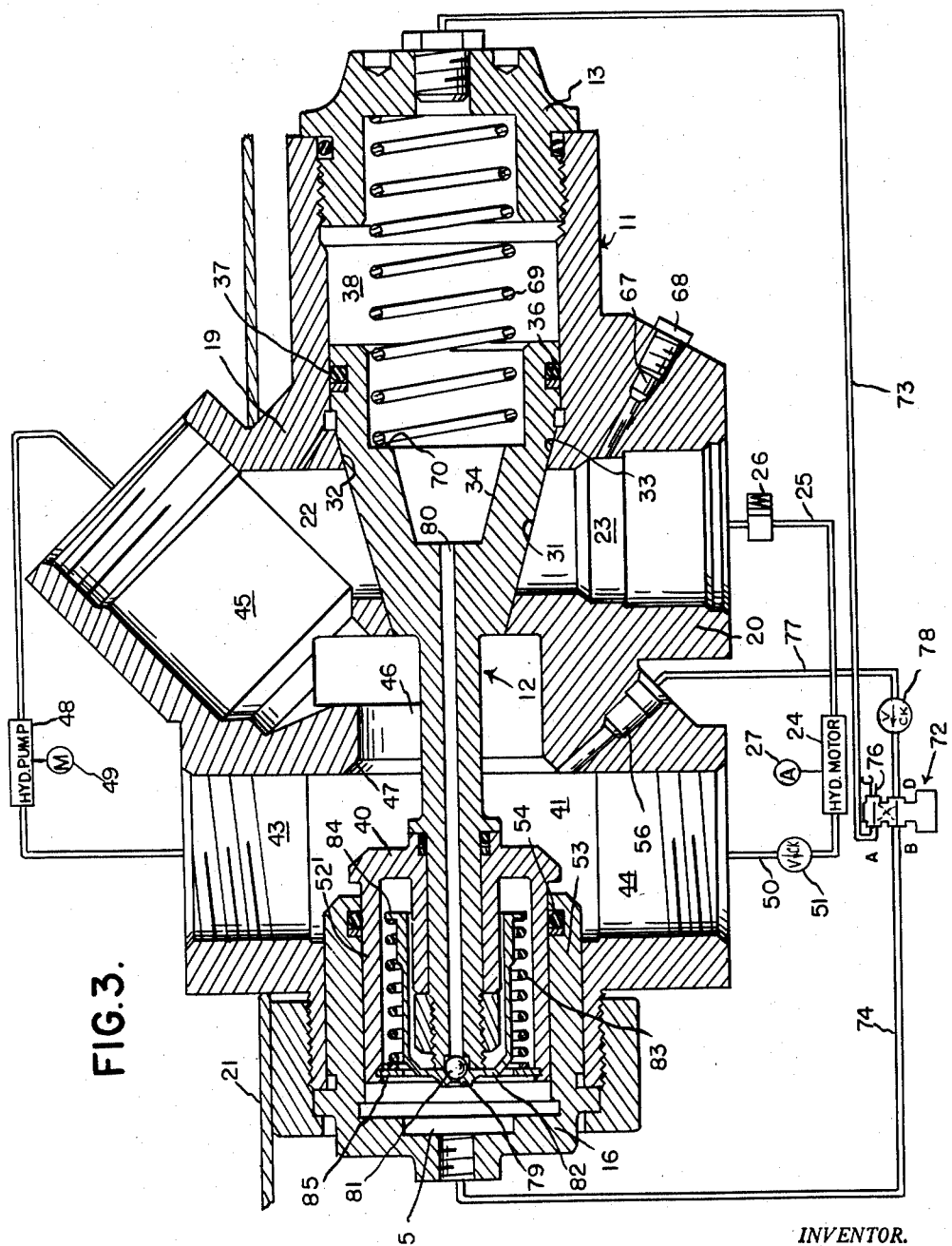

Dec. 23, 1958  L. A. MAJNERI  2,865,399
SHUT-OFF VALVE ASSEMBLY FOR FLUID PRESSURE SYSTEMS
Filed March 21, 1955  3 Sheets-Sheet 3
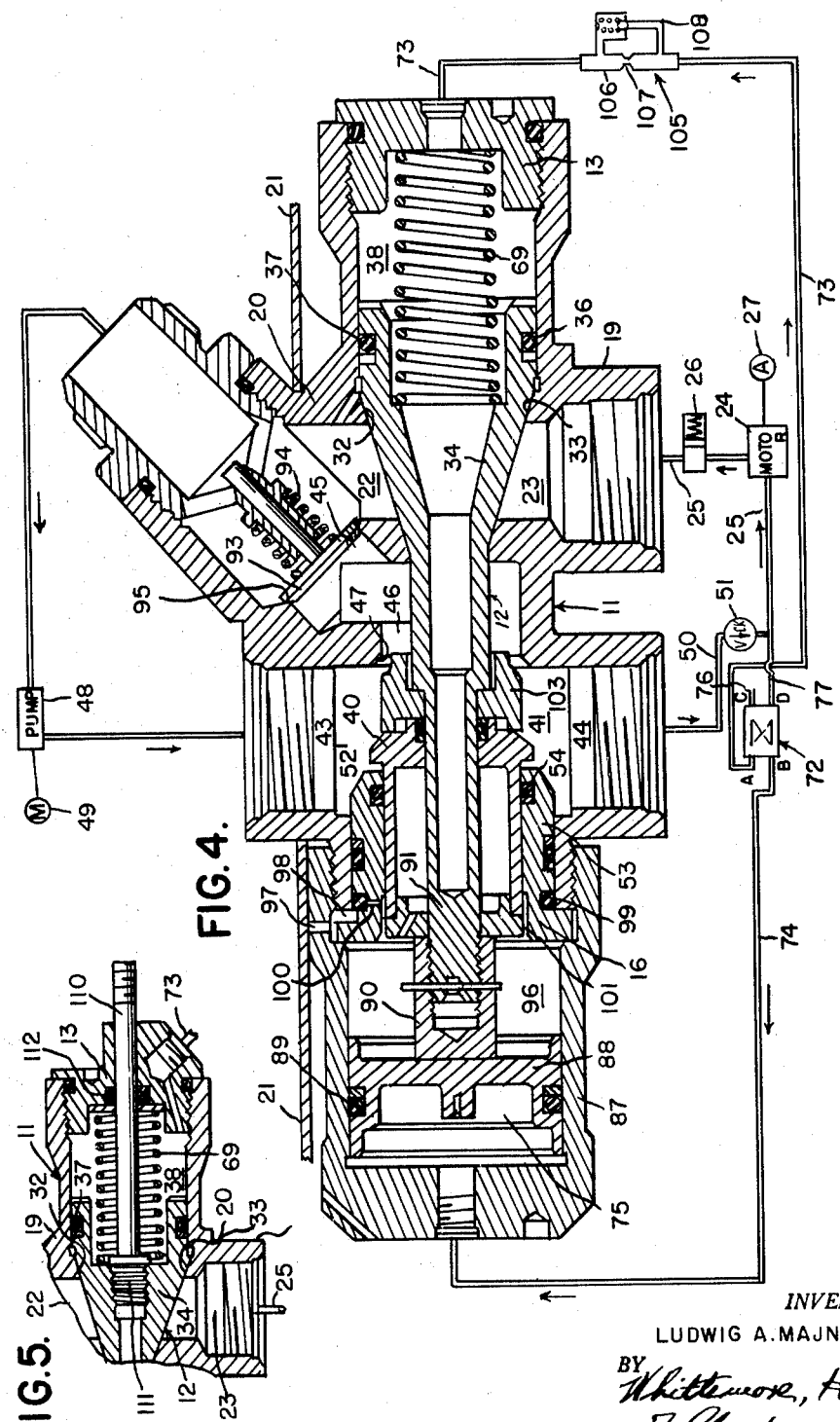
INVENTOR.
LUDWIG A. MAJNERI
BY Whittemore, Hulbert & Belknap
ATTORNEYS

United States Patent Office 2,865,399
Patented Dec. 23, 1958

2,865,399

SHUT-OFF VALVE ASSEMBLY FOR FLUID PRESSURE SYSTEMS

Ludwig A. Majneri, Grosse Pointe, Mich.

Application March 21, 1955, Serial No. 495,690

17 Claims. (Cl. 137—563)

This invention relates generally to valve assemblies and refers more particularly to improvements in shut-off valves capable of being used in connection with fluid pressure systems for discontinuing the flow of fluid through said systems.

The present application is a continuation-in-part of my prior copending application Serial No. 441,347, filed July 6, 1954.

In certain types of fluid pressure systems such, for example, as hydraulic systems employed on aircraft to drive various accessories, it is customary to circulate the hydraulic fluid under substantial pressure through the system by a pump operatively connected to the engine of the aircraft and housed within a compartment which is usually protected by a fire wall.

In installations of the foregoing type, there is always a danger of fire breaking out in the pump compartment and it is an object of this invention to provide a valve assembly rendering it possible to discontinue circulation of hydraulic fluid through the system and thereby avoid feeding any fire that may break out within the compartment with hydraulic fluid escaping from the system through a damaged line or conduit of the system extending into the compartment.

It is another object of this invention to provide a valve assembly having provision for bypassing hydraulic fluid medium from the pressure side of the pump to the intake side when the valve assembly is in its closed position or, in other words, when the circulation of hydraulic fluid medium through the system is discontinued.

Another object is to provide a valve assembly which has improved bypassing provisions to prevent damage to a hydraulic pump assembled in a system with the valve, when the valve is closed, and also to enable the valve to be readily opened automatically to operational position, even at the commencement of engine driven operation of the pump.

The foregoing as well as other objects will be made more apparent as this description proceeds especially when considered in connection with the accompanying drawings, wherein:

Figure 3 is a sectional view of another form of valve assembly;

Figure 4 is a sectional view of still another embodiment of the valve assembly; and Figure 5 is a fragmentary view in section similar to Figure 4, illustrating an alternative form of assembly embodying a manual operation feature.

Figure 1:
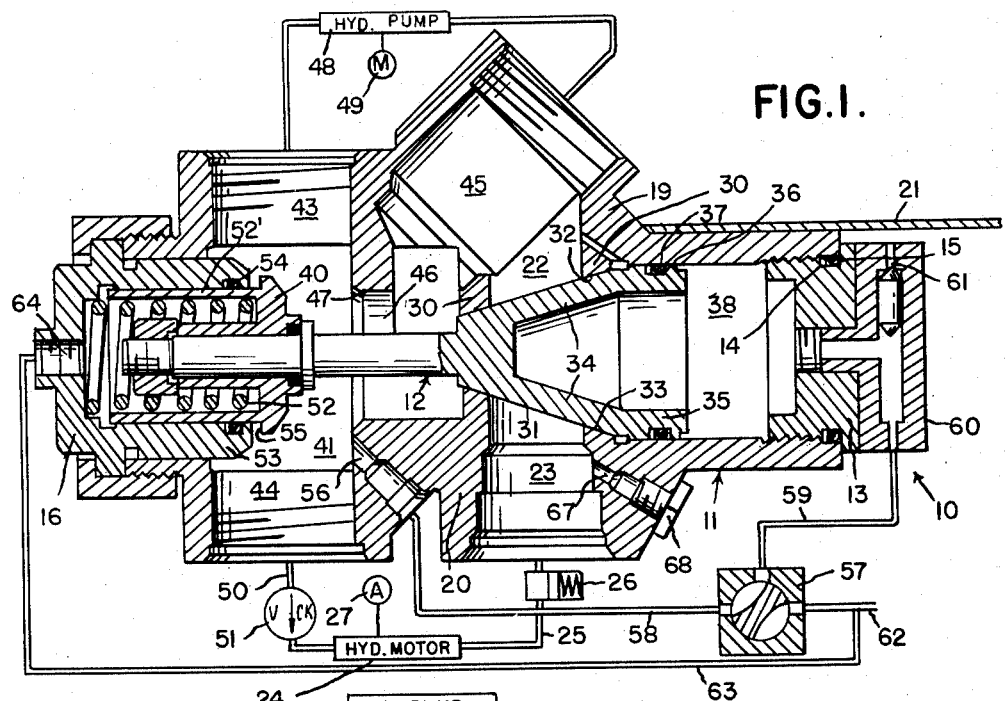
Figure 1 is a longitudinal sectional view through one embodiment of the valve assembly and also illustrating the hydraulic system diagrammatically.
Figure 2:
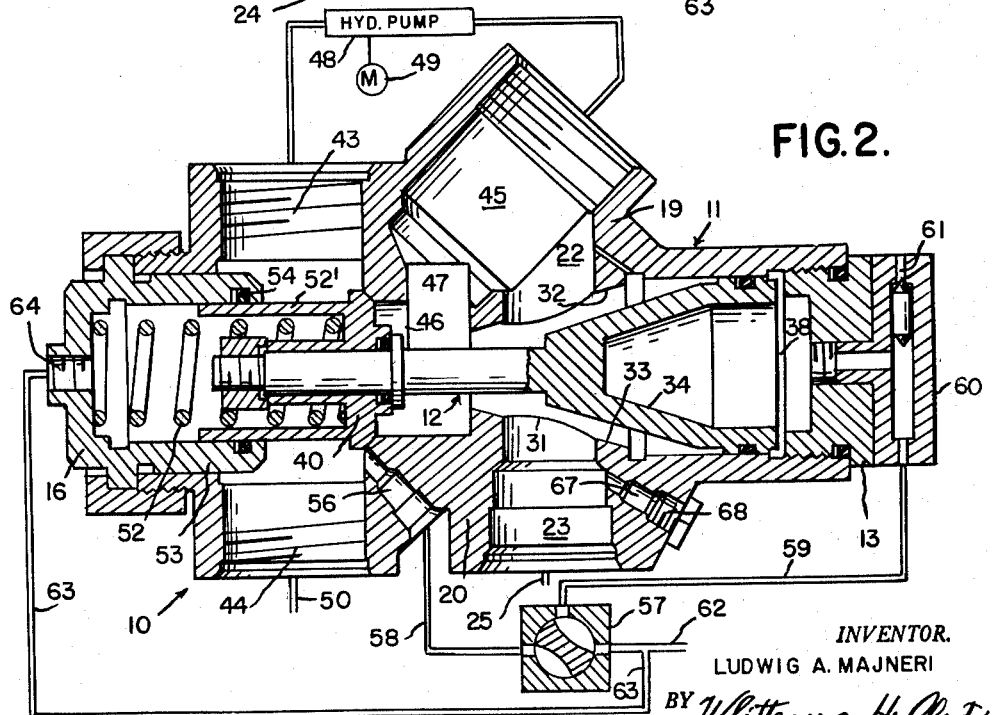
Figure 2 is a sectional view similar to Figure 1 showing the parts in a different position.

Referring first to the embodiment of the invention shown in Figures 1 and 2, the numeral 10 designates a shut-off valve assembly comprising an elongated cylinder 11 and a valve member 12 slidably supported in the cylinder 11. The outer ends of the cylinder 11 are open and one end is normally closed by a plug 13 having a portion threadably engageable with the inner wall of the cylinder. The plug 13 also has an annular groove 14 in the periphery thereof for receiving an O-ring seal 15 which engages the inner wall of the cylinder in the assembled position of the plug to prevent the escape of hydraulic fluid medium from the adjacent end of the cylinder. The opposite end of the cylinder 11 is closed by a plug 16 and other provisions hereinafter described in detail.

The cylinder 11 is provided intermediate the ends thereof with diametrically opposed outwardly projecting bosses 19 and 20. The boss 19 is adapted to project through an opening formed in a fire wall 21 and is axially bored to provide a pressure outlet port 22. The boss 20 is axially bored to provide a pressure inlet port 23 which is aligned with the outlet port 22 and is adapted for connection to the delivery side of a hydraulic motor 24 by a fluid conducting line 25 containing a pressurized reservoir 26. Hydraulic motor 24 is connected to the various accessories to be driven, and these accessories are indicated generally by the numeral 27.

The inner ends of the ports 22 and 23 open into the cylinder 11 through a tubular partition 30 projecting into the cylinder and having a bore 31 therethrough coaxially arranged with respect to the axis of the cylinder. The bore 31 is frusto-conical in shape and has the end of greatest diameter facing the plug 13. The inner surface of the bore 31 surrounding the outlet port 22 forms a conically shaped seat 32 and the inner surface of the bore 31 surrounding the port 23 forms a similar valve seat 33.

The valve member 12 has a part 34, which, for the purpose of simplicity, is shown as formed integral with the valve member 12 and in any case is provided with a cylindrical portion 35 at the outer end of a diameter to slidably engage the inner surface of the cylinder 11. The inner end of the part 34 is frusto-conical in shape and is fashioned to engage the valve seats 32, 33 to effectively close communication through the ports 22 and 23 in one position of the valve member 12. The cylindrical outer end portion 35 of the part 34 is fashioned with an annular groove 36 in the periphery thereof and an O-ring seal 37 is supported within the groove in a position to engage the adjacent inner wall of the cylinder 11. The arrangement is such that the outer end of the valve part 34 cooperates with the plug 13 to form a chamber 38 in the cylinder 11 and the O-ring seal 37 is positioned to prevent the escape of fluid under pressure past the valve part 34 into or out of the chamber 38.

The valve member 12 is an axially elongated one and has a second valve part 40 adjacent the plug 16. The valve part 40 operates in a chamber 41 formed in the cylinder 11 adjacent the plug 16.

The valve part 34 controls the flow of fluid through outlet and inlet ports 22 and 23, and the construction is such that when the valve member 12 is moved to its closed position, the frusto-conical portion of the valve part 34 engages tapered seats 32 and 33 respectively surrounding the inner ends of the ports 22 and 23. The cylinder 11 is also formed with diametrically opposed aligned pressure ports 43 and 44 arranged to communicate with the chamber 41. The pressure inlet port 43 communicates with the outlet port 22 through a bypass 45 formed in the body of the valve assembly and connected to the chamber 41 through a port 46 having an annular valve seat 47.

When the valve assembly is installed in a hydraulic system the pressure inlet port 43 is connected to the discharge side of a hydraulic pump 48 having the intake side connected to the bypass 45 and driven by a motor 49. The pressure outlet port 44 is connected by a fluid line 50 to the intake side of hydraulic motor 24 and the discharge side of the hydraulic motor is connected by line 25 to the return port 23. Reverse flow of fluid under pressure from the hydraulic motor through the valve assembly is prevented by a check valve 51 connected in the line 50.

Closing movement of the valve member 12 is resisted by a coil spring 52 having the outer end abutting the plug 16 and having the inner end abutting the valve part 40. In this connection, attention is called to the fact that the valve part 40 engages the valve seat 47 of the bypass 45 when the valve member 12 is in its open position shown in Figure 2 of the drawings. Hence, movement of the valve member 12 to its closed position with respect to the return or outlet and inlet ports 22 and 23 opens the bypass 45, enabling hydraulic fluid to flow from the discharge side of the pump 48 to the intake side when the valve assembly is in its closed position. This is advantageous in that it prevents damage to the hydraulic pump in the closed position of the valve assembly and, at the same time, affords ample protection in the event of failure of either of the fluid connections to the pump since only a relatively small amount of hydraulic fluid will escape from these lines, as compared with the whole volume contained in the entire system including the reservoir 26, hydraulically powered device or devices, and associated conduitry. Also, the recirculation of hydraulic fluid rendered possible by the bypass 45 facilitates starting the motor 49 since it permits, in effect, disconnecting the hydraulic motor 24 and its associated load 27 during the starting operation.

The valve assembly shown in Figures 1 and 2 is especially designed for use in installations where relatively high operating pressures are not available. Thus, valve part 40 for closing the bypass 45 is provided with an outwardly extending cylindrical portion 52' of reduced diameter which slidably engages within a cylindrical portion 53 projecting inwardly from the plug 16. An O-ring 54 is provided for establishing a fluid tight seal between the cylindrical portions 52' and 53. The arrangement is such that the area 55 of the valve part 40 exposed to the action of fluid under pressure flowing through the ports 43 and 44 in the open position (Figure 2) of the valve member 12, and acting to urge that member to the right, is very small. Thus, the force resisting closing movement of the valve member 12 shown in Figures 1 and 2 of the drawings is very small, and this is advantageous in cases where high operating pressures are not available or desirable.

Also in the embodiment of the invention shown in Figures 1 and 2, a port 56 communicates with the pressure outlet port 44 and is connected to a three-way valve 57 by a pressure line 58. The three-way valve 57 is also connected by a pressure line 59 to a shuttle valve 60 which in turn is connected to the chamber 38 through a port formed in the plug 13. The shuttle valve 60 has an emergency port 61 which may be and preferably is connected to another source of fluid under pressure.

It follows from the above that when the valve 57 is in the position thereof shown in Figure 1 of the drawings fluid under pressure passes through the shuttle valve 60 into the chamber 38 and closes the emergency port 61. However, should the pressure lines 58, 59 fail, fluid under pressure is admitted to the shuttle valve through the emergency port 61, in which event the main port connected to the line 59 is closed by the shuttle valve.

Movement of the valve member 12 to its open position shown in Figure 2 of the drawing is accomplished by the spring 52 when the three-way valve 57 is moved to its position shown in Figure 2 of the drawings. When in the latter position the fluid line 59 is connected to a line 62 and the latter contains fluid under relatively low pressure insufficient to move the valve member 12 in its closing direction. However, this relatively low pressure in the chamber 38 acts on the valve part 34 tending to move the valve member 12 in its closing direction. In order to counteract the force applied to the valve part 34 by this relatively low pressure, the line 62 is connected by a line 63 to a port 64 formed in the plug 16. Hence, the relatively low pressure contained in the line 62 also supplements the action of the spring 52 tending to move the valve member 12 to its open position. As a result of the above arrangement, the spring 52 need not be of sufficient strength to counteract the relatively low pressure existing in the chamber 38 when the valve member 12 is in its open position and a greater valve opening force is obtainable with a relatively light spring.

It will be noted that the return port 23 also communicates with a passage 67 which is normally closed by a plug 68. In some instances it is feasible to operate the valve member 12 with relatively low pressures and in such cases the fluid line 58 may be connected to the passage 67 by removing the plug 68 and inserting the latter into the port 56. This arrangement would enable employing a less expensive three-way valve since the latter would not be required to operate under the high pressures existing at the pressure ports 43 and 44.

In operation, the normal setting of the valve 12 is as shown in Fig. 2, the by-pass port 46 and passage 45 being closed by valve 40 under the force of spring 52, and the valve 40 being at least in part hydraulically balanced through the communication of its pressure chamber 38 through the line 59, valve 57 and line 63 to the opposite end port 64. Free communication exists between the hydraulic pump 48, pressure inlet and outlet passages 43, 44, the external line including hydraulic motor 24, and inlet and outlet passages 23, 22, respectively.

In the event of an emergency, the valve 57 is manipulated to the position of Fig. 1, which applies the hydraulic pump pressure in the space 41 between passages 43 and 44 to the independent line 58 and through valve 57 to the line 59 and pressure space 38. The pump pressure suffices to urge the frustro-conical member 34 of valve 12 to the left and seal off communication between the passages or ports 22 and 23, while at the same time opening the by-pass port 46 and passage 45 for recirculatory pumping action.

This signifies that the circulation of hydraulic liquid from the pressurized reservoir 26 is cut off, leaving but a small amount of liquid which can conceivably be pumped into the external, hydraulic motor line, considering the relative hydraulic friction loads involved. The risk of spreading a fire from the engine compartment, adjacent or in which the pump 48 is normally operated, and which is shielded by the fire wall 21, to the remainder of the external system, which is normally connected to instrumentalities distributed throughout the remainder of the fuselage of an airplane, is vastly reduced or eliminated.

Structurally, the valve disclosed in Figure 3 of the drawings is similar to the one shown in Figures 1 and 2, and the same reference numerals are used to designate corresponding parts. In Figure 3 of the drawings, the spring 52 (Figures 1 and 2) is omitted and a spring 69 is located within the chamber 38. The inner end of the spring 69 seats on a shoulder 70 formed on the valve part 34 and the outer end of the spring 69 engages the plug 13. The arrangement is such that the spring 69 normally urges the valve member 12 to a position wherein the return ports 22, 23 are closed by the valve part 34 and the bypass 45 is opened by the valve 40. The location of the spring 69 in a position to normally urge the valve member 12 closed and the bypass valve 40 to its open position has certain advantages which will become apparent as this description proceeds.

The numeral 72 in Figure 3 designates a solenoid operated four-way valve having ports A, B, C, and D. The port A is connected to the chamber 38 by a conduit 73 and the port B is connected by a conduit 74 to a chamber 75 formed by the cooperation of the plug 16 with the cylindrical part 52' on the bypass valve 40. The port C is connected to a conduit 76 containing a predetermined back pressure similar to the line 62 in Figures 1 and 2 of the drawings. The port D is connected by a conduit 77 to the pressure port 56 through a check valve 78 arranged to permit fluid flow in the direction of the arrow and to prevent the flow of fluid in the opposite direction.

In the de-energized position of the valve 72 shown in solid lines in Figure 3, the chamber 38 is connected to the conduit 76 which contains a pressure substantially less than the pressure required in the chamber 38 to close the valve member 12 and open the bypass valve 40. Also, the pressure port 56 of chamber 41 is connected to the chamber 75 so that the relatively high pressure in the chamber 41 acts on the relatively large area of the outer surface of the bypass valve 40 to assist the pressure acting on the valve part 34 in holding the valve member 12 in its open position against the action of the spring 69. However, when the solenoid valve 72 is energized, the conduit 77 of pressure port 56 is connected to the chamber 38 (broken lines in Figure 3) and the relatively low back pressure conduit 76 is connected to the chamber 75. Thus, the force exerted on the bypass valve 40 tending to resist closing of the valve member 12 is reduced and the pressure in the chamber 38 at the outer end of the valve part 34 is materially increased so that the valve member 12 is moved to its closed position wherein the return ports 22, 23 are closed and wherein the bypass 45 is opened by the valve 40. The fluid under pressure admitted to the chamber 38 through the conduit 73 is trapped in the chamber 38 by the check valve 78. Thus, the valve member 12 is held in its closed position with respect to the return ports 22, 23 even though the pressure supply conduit 77 or high pressure source should fail for any reason. Moreover, due to the fact that the spring 69 assists the force applied by the relatively high pressure trapped in the chamber 38 to hold the valve member 12 in its closed position relative to the return ports 22 and 23, the valve member 12 remains closed even in instances where the fluid pressure at the return inlet port 23 exceeds the pressure trapped within the chamber 38.

The valve structure shown in Figure 3 is also provided with a pressure relief valve 79. In detail, the numeral 80 designates a passage extending axially through the valve member 12 in a manner to connect the chamber 38 with the chamber 75, previously described as formed by the cooperation of the plug 16 with the cylindrical part 52' on the bypass valve 40. The passage 80 is normally closed by a ball valve 81 yieldably urged to its closed position by a cap 82 and a spring 83. The cap 82 has an inwardly extending cylindrical wall concentric with the adjacent end of the valve member and terminating in a radially outwardly extending flange 84. The flange 84 forms an abutment for the inner end of the spring 83 and a snap ring 85 is secured to the outer end of the part 52' for engagement by the outer end of the spring 83. The arrangement is such that the ball 81 opens to relieve the pressure in the chamber 38 should this pressure approach destructive proportions for any reason. It will also be noted that the spring 83 is supported in a manner such that it does not influence movement of the valve member 12 in either direction.

The embodiment of the invention shown in Figure 4 operates on the principle of the form of Figure 3 and resembles it closely, so that corresponding reference numerals are employed to designate parts of corresponding function, even though they may differ slightly in specific structural details. The pressure relief feature 79 of Figure 3 including ball valve element 82 and parts associated therewith, together with valve passage 80 of Figure 3 may be eliminated.

Cylindrical end cap 87 is threaded on the left hand extremity of cylinder 11, a shoulder on this cap abutting an end closure plug 16 for the cylinder and holding the plug in assembly. This end cap 87 affords an end pressure chamber corresponding to the chamber 75 of Figure 8, to which the line 74 delivers.

An enlarged booster piston 88 equipped with an O-ring seal is disposed in the chamber 75. This piston has end engagement with a spacer sleeve 90 secured to a stem 91 of valve member 12. Accordingly, piston 88 in effect constitutes a part of valve member 12. As in the other form, spring 69 tends to urge member 12 to keep the passage between ports 22, 23 closed and to open the bypass passage, so that in an emergency it is never necessary to rely on the trapping of fluid or the application of fluid pressure in chamber 38, as may be the case when a spring is placed in the opposite end of the cylinder, i. e., as in Figures 1 and 2.

Pressure from ports 43, 44 is supplied to the four-way solenoid valve 72, as in the preceding form, and pressure is supplied to chamber 75 and to piston 88 through line 74 when valve member 12 is to be moved to the right to open ports 22, 23. The passage between the last named ports is closed and bypass port 46 is open when the motor or engine 49 driving hydraulic pump 48 is being started. With little restriction to flow through bypass 46 the pressure at port 43 will ordinarily not build up sufficiently, at low engine speed, to move valve member 12 to its operational position, in which bypass port 46 is closed and the passage through ports 22, 23 is open.

To meet this condition a spring loaded poppet valve 93 is provided in bypass passage 45, being urged by a coil spring 94 to engage against a seat 95 formed in the passage. This permits an initial pressure to build up across ports 43, 44 in starting engine 49.

Furthermore, the opening force on valve member 12 is increased by the use of the enlarged diameter booster piston 88, whose area is considerably greater than that of the valve part 40 of said member.

The space 96 between booster piston 88 and plug 16 is vented to atmosphere to eliminate a built up back pressure. To this end a vent opening 97 is formed through the wall of end cap 87 adjacent its threaded connection to cylinder 11, the opening 97 communicating inwardly with a series of radial recesses 98 milled in the plug and opening to its outer periphery. A porous filter ring 99 is disposed in a groove in plug 16 adjacent these recesses, and a series of radial ports 100 through the plug communicate the groove with an internal counterbore 101 of the plug which opens to the space 96. Due to the use of booster piston 88, the use of low pressure poppet valve 93, and the venting of end cap 87, the valve member 12 is moved to the right to open position at considerably lower starting pressures than can be done with the construction of Figure 3.

Furthermore, it has been found that the arrangement of Figure 3 may occasion shocks of the nature of a liquid hammer upon closing of valve part 40 against its seat 47 when valve member 12 moves to the right. This is due to the relatively sudden shut-off of the bypass flow after a considerable portion of the valve stroke during which flow is not appreciably reduced. Accordingly, the embodiment of Figure 4 incorporates an adapter or restrictor member 103 in the form of a shaped sleeve held on the stem 91 of the valve member by abutment with part 40. Thus a gradual closing of bypass port 46 is accomplished during a linear movement of stem 91 to the right.

As shown in Figure 4 the check valve controlled line 50 from pressure port 44 has a common connection, as by a T, to the line 25 supplying motor 24 and to the line 77 leading to solenoid valve 72. It is also desirable to incorporate in the line 73, which leads from port A of valve 72 to cylinder chamber 38, a suitable throttling device 105, so as to permit a fast closing movement of valve member 12 to the left and a slower opening movement in the opposite direction. Device 105 may take the form of a chamber 106 affording a return flow restricting throat at 107, which chamber is by-passed by a one way, spring urged check valve 108.

Another possible refinement of the valve assembly of Figure 4 is depicted in Figure 5, in which corresponding reference numerals are applied to corresponding parts. Here provision is made for the manual opening of valve member 12 when desired.

An operating stem 110 is fixedly connected by a threaded connection 111 to the valve part 34 of member 12, this stem extending through end plug 13. A suitable seal 112 prevents leakage axially of stem 110, and it may be provided with an operating handpiece externally of plug 13, whereby a pulling movement will open the passage through ports 22, 23 and close bypass port 46. Spring 69 opposes such movement. Emergency mechanical movement of the valve member 12 to closed position is also possible in the event of damage to the hydraulic pressure control lines.

What I claim as my invention is:

1. A shut off valve assembly comprising a hollow valve body having inlet and outlet ports adapted to communicate the interior thereof in fluid circulating relation to a pump and to an external line, with said outlet port in communication with the intake side of said pump and said inlet port in communication with said external line, a pressure operated valve member movable in said valve body to close and open communication between said ports, said body having a pressure chamber to which said valve member is exposed to urge the same to closing position and having further pressure inlet and outlet ports to communicate the same respectively with the discharge side of said pump and said external line, thereby to establish a continuous fluid circulatory line including said ports, pump and external line, a by-pass passage in said body to communicate said further pressure inlet port with said first named outlet port and thereby establish a fluid by-pass line including said pump, a valve element in said body movable with said valve member to open said by-pass passage when said member is in closing position, said body having a pressure space to which said valve element is exposed in a direction to urge the same to close said by-pass passage, and a valve controlled pressure line connected between said further pressure outlet port and said pressure chamber and pressure space, respectively, said valve controlled pressure line including means to selectively connect said pressure chamber and space in alternation to relatively high and low pressures.

2. A shut off valve assembly comprising a hollow valve body having inlet and outlet ports adapted to communicate the interior thereof in fluid circulating relation to a pump and to an external line, with said outlet port in communication with the intake side of said pump and said inlet port in communication with said external line, a pressure operated valve member movable in said valve body to close and open communication between said ports, said body having a pressure chamber to which said valve member is exposed to urge the same to closing position and having further pressure inlet and outlet ports to communicate the same respectively with the discharge side of said pump and said external line, thereby to establish a continuous fluid circulatory line including said ports, pump and external line, a by-pass passage in said body to communicate said further pressure inlet port with said first named outlet port and thereby establish a fluid by-pass line including said pump, a valve element in said body movable with said valve member to open said by-pass passage when said member is in closing position, said body having a pressure space to which said valve element is exposed in a direction to urge the same to close said by-pass passage, a valve controlled pressure line connected between said further pressure outlet port and said pressure chamber and pressure space, respectively, said valve controlled pressure line including means to selectively connect said pressure chamber and space in alternation to relatively high and low pressures, and a resiliently biased valve controlling said by-pass passage when said by-pass valve element is in open position.

3. A valve assembly in accordance with claim 1 in which said valve element is exposed on opposite sides thereof to pressure in said further pressure inlet port and said pressure space in said body, respectively, the area of said element exposed in said pressure space exceeding that exposed on the opposite side thereof.

4. A valve assembly in accordance with claim 2 in which said valve element is exposed on opposite sides thereof to pressure in said further pressure inlet port and said pressure space in said body, respectively, the area of said element exposed in said pressure space exceeding that exposed on the opposite side thereof.

5. A shutoff valve assembly comprising a hollow valve body having inlet and outlet ports adapted to communicate the interior thereof in fluid circulating relation to a pump and to an external line, with said outlet port in communication with the intake side of said pump and said inlet port in communication with said external line, a pressure operated valve member movable in said valve body to close and open communication between said ports, said body having a first pressure space to which said valve member is exposed to urge the same to closing position, and having further pressure inlet and outlet ports to communicate the same respectively with the discharge side of said pump and said external line, thereby to establish a continuous fluid circulatory line including said ports, pump and external line, a valve element in said body movable with said valve member, said body having a by-pass passage adapted to connect said further inlet port with said first named outlet port to establish a by-pass line through said ports and pump exclusive of said external line, said body having a second pressure space to which said valve element is exposed in a direction to urge the same to close said by-pass passage, and a valve controlled pressure line connected between said further pressure outlet port and at least one of said pressure spaces to adjust the relationship of pressures therein, and thereby control movement of said valve member and said valve element in closing and opening said first named inlet and outlet ports and said by-pass passage, respectively, said valve controlled pressure line including means to selectively connect at least one of said pressure spaces in alternation to relatively high and low pressures.

6. A valve assembly in accordance with claim 5, in which said valve element is exposed on opposite sides thereof to pressure in said further pressure inlet port and said second pressure space, respectively, the area of said element exposed in said second pressure space exceeding that exposed on the opposite side thereof.

7. A valve assembly for closing a fluid pressure supply conduit of a pressure line disposed in fluid circulating relation to a fluid pressure source and a fluid pressure operated device, comprising a body having a cylinder provided with inlet and outlet ports intermediate the ends thereof, valve seats respectively surrounding the ports within the cylinder and tapered axially of the cylinder, a valve member mounted in the cylinder for sliding movement axially of the cylinder and having a tapered part engageable with the seats to close communication through said ports upon movement of the valve member in a closing direction relative to the cylinder, said cylinder having a first chamber at the end of the tapered part of greater diameter and having a second chamber at the opposite end of the tapered part provided with a first inlet opening and an outlet opening adapted to be connected respectively to said pressure source and pressure operated device, said body having a further inlet opening for fluid under pressure communicating with the first chamber and operable to admit fluid under pressure into the first chamber to move the valve member in its closing direction toward the second chamber, and means including a valve-controlled conduit adapted to connect said second chamber and said first inlet opening with said pressure source and thereby bypass said pressure operated device.

8. The structure defined in claim 7 comprising a second part on the valve member exposed to the pressure in the second chamber and constituting a valve control element for said last named valve-controlled conduit.

9. The structure defined in claim 7 comprising a check valve normally closing said further inlet opening in response to the fluid pressure within the first chamber.

10. The structure defined in claim 9 comprising a pressure relief port communicating with the first chamber at the outer side of the tapered valve part, and a valve for controlling the pressure relief port.

11. The structure defined in claim 7 comprising a pressure relief passage extending through the valve member from the first chamber, and a check valve normally closing said relief passage.

12. The structure defined in claim 7 wherein the tapered valve part has a cylindrical portion at the outer end slidably engaging the inner surface of the cylinder, a fluid tight seal for the joint between the cylindrical portion and adjacent wall of the cylinder, and a passage connecting the space in the first chamber at the inner side of the seal of the outlet port.

13. The structure defined in claim 12 comprising a second part on the valve member exposed to the pressure within the second chamber and having a cylindrical portion slidably engageable with the adjacent wall of the cylinder, a fluid tight seal for the joint between the second cylindrical portion and the adjacent wall of the cylinder, and a passage connecting the second chamber at the inner side of the second named seal to the outlet port.

14. The structure defined in claim 13 comprising a pressure relief passage extending through the valve member and connecting the first chamber with a relatively low pressure area, and a check valve normally closing the pressure relief passage.

15. The structure defined in claim 7, and further comprising a second valve part movable with the valve member and positioned to close said controlled by-pass conduit upon movement of the valve member in a port opening direction.

16. A valve assembly for closing a fluid pressure supply conduit of a pressure line disposed in fluid circulating relation to a fluid pressure source and a fluid pressure operated device, comprising a body having a cylinder provided with inlet and outlet ports intermediate the ends thereof, valve seats respectively surrounding the ports within the cylinder and tapered axially of the cylinder, a valve member mounted in the cylinder for sliding movement axially of the cylinder and having a tapered part engageable with the seats to close communication through said ports upon movement of the valve member in a closing direction relative to the cylinder, said cylinder having a first chamber at the end of the tapered part of greatest diameter and having a second chamber at the opposite end of the tapered part, said body having a further inlet opening for fluid under pressure communicating with the first chamber and operable to admit fluid under pressure into the first chamber to move the valve member in its closing direction toward the second chamber, and means including a fluid line to communicate said second chamber with said further inlet opening of said body when said valve member is in port closing position.

17. A valve assembly for closing a fluid pressure supply conduit of a pressure line disposed in fluid circulating relation to a fluid pressure source and a fluid pressure operated device, comprising a body having a cylinder provided with inlet and outlet ports intermediate the ends thereof, valve seats respectively surrounding the ports within the cylinder and tapered axially of the cylinder, a valve member mounted in the cylinder for sliding movement axially of the cylinder and having a tapered part engageable with the seats to close communication through said ports upon movement of the valve member in a closing direction relative to the cylinder, said cylinder having a first chamber at the end of the tapered part of greatest diameter and having a second chamber at the opposite end of the tapered part, said body having a further inlet opening for fluid under pressure communicating with the first chamber and operable to admit fluid under pressure into the first chamber to move the valve member in its closing direction toward the second chamber, and means including fluid line in communication with said second chamber and a valve controlling said line to communicate said second chamber with said further inlet opening of said body when said valve member is in port closing position.

References Cited in the file of this patent

UNITED STATES PATENTS

| | | |
|---|---|---|
| 306,880 | Wallace | Oct. 21, 1884 |
| 617,437 | Cochran | Jan. 10, 1899 |
| 2,744,719 | McRae | May 8, 1956 |

FOREIGN PATENTS

| | | |
|---|---|---|
| 640,848 | Germany | Jan. 13, 1937 |